United States Patent
Verma et al.

(10) Patent No.: US 10,227,458 B2
(45) Date of Patent: Mar. 12, 2019

(54) POLYMERIC NANOCOMPOSITES AND METHODS FOR THEIR PREPARATION AND USE

(71) Applicant: INDIAN INSTITUTE OF TECHNOLOGY KANPUR, Kanpur, Uttar Pradesh (IN)

(72) Inventors: Nishith Verma, Kanpur (IN); Jayant Kumar Singh, Kanpur (IN); Ajit Kumar Sharma, Kanpur (IN)

(73) Assignee: INDIAN INSTITUTE OF TECHNOLOGY KANPUR, Uttar Pradesh (IN)

(*) Notice: Subject to any disclaimer, the term of this patent is extended or adjusted under 35 U.S.C. 154(b) by 367 days.

(21) Appl. No.: 14/435,432

(22) PCT Filed: Oct. 1, 2013

(86) PCT No.: PCT/IB2013/059034
§ 371 (c)(1),
(2) Date: Apr. 13, 2015

(87) PCT Pub. No.: WO2014/060891
PCT Pub. Date: Apr. 24, 2014

(65) Prior Publication Data
US 2015/0267011 A1 Sep. 24, 2015

(30) Foreign Application Priority Data
Oct. 17, 2012 (IN) .......................... 3233/DEL/2012

(51) Int. Cl.
*C08J 5/04* (2006.01)
*H01M 2/16* (2006.01)
(Continued)

(52) U.S. Cl.
CPC .............. *C08J 5/042* (2013.01); *C08J 5/005* (2013.01); *H01M 2/145* (2013.01);
(Continued)

(58) Field of Classification Search
None
See application file for complete search history.

(56) References Cited

U.S. PATENT DOCUMENTS

| 2,643,994 A | 6/1953 | Germain et al. |
| 4,272,470 A | 6/1981 | Hsu et al. |

(Continued)

FOREIGN PATENT DOCUMENTS

IN    1157/DEL/2009 A    10/2010

OTHER PUBLICATIONS

"Energain™ Separators Bring Batteries More Power,Longer Life," accessed on www2.dupont.com/Energy_Storage/en_US/tech_info/technical_info.html, accessed at Aug. 9, 2012, pp. 2.
(Continued)

*Primary Examiner* — Lucas J. O'Donnell (57) ABSTRACT

Methods of forming a polymeric nanocomposite are provided. The methods include combining one or more monomers to form a mixture and adding a plurality of carbon fibers to the mixture prior to or concurrently with formation of a polymer from the monomers. The methods can also include polymerizing the monomers to form the polymer and adding a hydrophobic agent and a plasticizer to the mixture to form the polymer nanocomposite.

17 Claims, 6 Drawing Sheets

(51) Int. Cl.
  *H01M 2/14* (2006.01)
  *C08J 5/00* (2006.01)
  *H01M 10/0525* (2010.01)

(52) U.S. Cl.
  CPC ....... *H01M 2/1613* (2013.01); *H01M 2/1653* (2013.01); *C08J 2329/04* (2013.01); *C08J 2433/20* (2013.01); *C08J 2471/02* (2013.01); *H01M 10/0525* (2013.01)

(56) References Cited

U.S. PATENT DOCUMENTS

| | | | |
|---|---|---|---|
| 4,789,609 | A | 12/1988 | Ambrose-Ritchey et al. |
| 4,812,145 | A | 3/1989 | LaBonte |
| 5,962,544 | A | 10/1999 | Waller, Jr. |
| 6,258,488 | B1 | 7/2001 | Askew et al. |
| 6,265,333 | B1* | 7/2001 | Dzenis .................. B32B 5/28 156/276 |
| 6,361,722 | B1 | 3/2002 | Theys et al. |
| 7,399,322 | B2 | 7/2008 | Yu |
| 7,438,970 | B2 | 10/2008 | Magario et al. |
| 7,789,930 | B2 | 9/2010 | Ensor et al. |
| 7,815,825 | B2 | 10/2010 | Funaoka et al. |
| 2005/0191490 | A1 | 9/2005 | Ton-That et al. |
| 2007/0003749 | A1 | 8/2007 | Oh et al. |
| 2008/0170982 | A1* | 7/2008 | Zhang .................. B82Y 10/00 423/447.3 |
| 2009/0148573 | A1* | 6/2009 | Kitamura .............. C08B 1/003 426/323 |
| 2009/0305024 | A1* | 12/2009 | Gvozdic ................ C08J 3/075 428/304.4 |
| 2010/0178545 | A1 | 7/2010 | Pan et al. |
| 2011/0003210 | A1 | 1/2011 | Lim et al. |
| 2012/0077015 | A1 | 3/2012 | Zhou et al. |
| 2015/0210813 | A1* | 7/2015 | Arai ...................... C08J 5/24 428/298.7 |

OTHER PUBLICATIONS

Arora, P., and Zhang, Z., "Battery Separators," Chem. Rev., vol. 104, No. 10, pp. 4419-4462 (Mar. 30, 2004).
Bikshapathi, M., et al., "Preparation of carbon molecular sieves from carbon micro and nanofibers for sequestration of $CO_2$," chemical engineering research and design, vol. 89, pp. 1737-1746 (2011).
Chakraborty, A., et al., "Adsorbents based on carbon microfibers and carbon nanofibers for the removal of phenol and lead from water," Journal of Colloid and Interface Science, vol. 359, No. 1, pp. 228-239 (Jul. 1, 2011).
Chung, Y.S., et al., "Enhancement of Meltdown Temperature of the Polyethylene Lithium-Ion Battery Separator via Surface Coating with Polymers Having High Thermal Resistance," Ind. Eng. Chem. Res, vol. 48, No. 9, pp. pp. 4346-4351 (Mar. 24, 2009).
Gupta, A.K., et al., "Adsorptive Removal of Fluoride by Micro-nanohierarchal Web of Activated Carbon Fibers," Ind. Eng. Chem. Res, vol. 48, pp. 9697-9707 (2009).
Gupta, A.K., et al., "Fe-Grown Carbon Nanofibers for Removal of Arsenic(V) in Wastewater," Ind. Eng. Chem. Res., vol. 49, No. 15, pp. 7074-7084 (2010).
Huai, Y., et al., "Preparation and characterization of a special structural polyacrylonitrile)-based microporous membrane for lithium-ion batteries," Ionics, vol. 16, No. 17, pp. 603-611 (Sep. 1, 2010).

International Search Report and Written Opinion for counterpart International Patent Application No. PCT/IB2013/059304 dated Feb. 27, 2014.
Jochims, C.J., "Hydrierung von Carbodiimiden," Chemische Berichte, vol. 98, No. 7, pp. 2128-2133 (Jul. 1965).
Kikugawa, Y., et al., The reaction of substituted ureas with sodium borohydride in pyridine, Tetrahedron Letters, vol. 10, No. 9, pp. 699-702 (1969).
Kim, M., et al., "Preparation of a trilayer separator and its application to lithium-ion batteries," Journal of Power Sources, vol. 195, No. 24, pp. 8302-8305 (Dec. 15, 2010).
Kuribayashi, I., "Characterization of composite cellulosic separators for rechargeable lithium-ion batteries," Journal of Power Sources, vol. 63, No. 1, pp. 87-91 (Nov. 1996).
Laheäär, A., et al., "LiPF 6 based ethylene carbonate—dimethyl carbonate electrolyte for high power density electrical double layer capacitor," Electrochimica Acta, vol. 54, No. 19, pp. 4587-4594 (Jul. 30, 2009).
Larizza, A., et al., "The Reaction of Substituted Ureas with Lithium Aluminum Hydride. I. A New Synthesis of Three-Substituted Formamidines," J. Org. Chem., vol. 29, No. 12, pp. 3697-3700 (1964).
Lianga, Y., et al., "Preparation and electrochemical characterization of ionic-conducting lithium lanthanum titanate oxide/polyacrylonitrile submicron composite fiber-based lithium-ion battery separators," Journal of Power Sources, vol. 196, No. 1, pp. 436-441 (Jan. 2011).
Park, J-H.,et al., "Close-packed poly(methyl methacrylate) nanoparticle arrays-coated polyethylene separators for high-power lithium-ion polymer batteries," Journal of Power Sources, vol. 196, pp. 7035-7038 (2011).
Pshezhetskii, V.S., et al., "A differential scanning calorimetry study of polyvinyl alcohol," Polymer Science U.S.S.R., vol. 32, No. 4, pp. 722-726 (1990).
Pu, W., "Preparation of P(AN—MMA) microporous membrane for Li-ion batteries by phase inversion," Journal of Membrane Science, vol. 280, No. 1-2, pp. 6-9 (Sep. 1, 2006).
Rathore, R.S., et al., "Development of surface functionalized activated carbon fiber for control of NO and particulate matter," Journal of Hazardous Materials, vol. 173, pp. 211-222 (2010).
Singhal, R.M., et al., "Micro-Nano Hierarchal Web of Activated Carbon Fibers for Catalytic Gas Adsorption and Reaction," Ind. Eng. Chem. Res., vol. 47, pp. 3700-3707 (2008).
Stefan, C.S., et al., "Are ionic liquids based on pyrrolidinium imide able to wet separators and electrodes used for Li-ion batteries?," Journal of Power Sources, vol. 189, No. 2, pp. 1174-1178 (Apr. 15, 2009)
Torizuka, M., et al., "Synthesis of Hexasubstituted Carbamimidic Acid Anhydrides and of N 1,N 1,N 2-Trisubstituted Formamidines from 1,1,3-Trisubstituted Ureas," Synthesis, vol. 1986, No. 3, pp. 226-228 (Jan. 1, 1986).
Venugopal, G., et al., "Characterization of microporous separators for lithium-ion batteries," Journal of Power Sources, vol. 77, pp. 34-41 (1999).
Zhang, S.S., "A review on the separators of liquid electrolyte Li-ion batteries," Journal of Power Sources, vol. 164, pp. 351-364 (2007).
Zhang, X., et al., "Poly(vinyl alcohol)/SWNT Composite Film," NANO Letters, vol. 3, No. 9, pp. 1285-1288 (2003).
International Search Report and Written Opinion dated May 7, 2014 as received in PCT Application No. PCT/IB2013/059034.

\* cited by examiner

POLYMERIC NANOCOMPOSITES AND METHODS FOR THEIR PREPARATION AND USE

CROSS-REFERENCE TO RELATED APPLICATION

This application is a U.S. National Stage filing under 35 U.S.C. § 371 of International Application No. PCT/IB2013/059034, filed on Oct. 1, 2013, which claims the benefit of Indian Patent Application Number 3233/DEL/2012, filed on Oct. 17, 2012, the entire contents of which are incorporated herein by reference in their entirety.

BACKGROUND

Rechargeable lithium-ion batteries are considered as an effective solution to the increasing need for high energy density electrochemical power sources. Typically, the rechargeable batteries include microporous membranes as battery separators that are interposed between an anode and a cathode in a fluid electrolyte. The battery separator separates the anode and the cathode while allowing transport of ionic charge carriers through the separator. In general, the battery separator material is required to be chemically and electrochemically stable towards the electrolyte and should be mechanically strong to withstand induced high tension during assembly and operation of the battery. In addition, the separator material should be thin and should have relatively small electrical resistivity or large ion conductivity, good electrolyte wettability, and thermal stability.

Various microporous membranes or sheet materials have been used as battery separators. Separators currently used in battery systems are formed of polymeric films which when placed in an electrolyte, are capable of exhibiting a high degree of conductivity. Polyethylene (PE) and polypropylene (PP) are two common precursors used for preparing separators for Li-ion batteries. The PE and PP separators have good tensile strength and are electrochemically stable toward the electrolyte and electrode materials, preventing internal short-circuiting or rapid overcharging of the battery. However, such separators have relatively poor compatibility with liquid electrolytes because of their hydrophobic properties. Moreover, manufacturing costs of battery separators using PE and PP are substantially high. Other polymeric materials have been used for the battery separators, but in general, such materials are not capable of forming thin microporous membranes with low electrical resistivity and high tensile strength.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, methods of forming a polymeric nanocomposite are provided. The methods include combining one or more monomers to form a mixture and adding a plurality of carbon fibers to the mixture prior to or concurrently with formation of a polymer from the monomers. The methods can also include polymerizing the monomers to form the polymer and adding a hydrophobic agent and a plasticizer to the mixture to form the polymer nanocomposite.

In accordance with another aspect, methods of forming a polymeric nanocomposite are provided. The methods include milling a plurality of carbon microfibers and carbon nanofibers dispersed in a surfactant to form milled hybrid carbon fibers and esterifying polyvinyl acetate to form polyvinyl alcohol (PVA) gel. The methods can also include adding the milled hybrid carbon fibers to the polyvinyl acetate prior to or concurrently with formation of the polyvinyl alcohol (PVA) gel and adding a hydrophobic agent and a plasticizer to the PVA gel and hybrid carbon fibers to form the polymer nanocomposite.

In accordance with another aspect, polymeric nanocomposites are provided. The polymeric nanocomposites can include a polymeric material having a plurality of hybrid carbon fibers embedded therein. The plurality of hybrid carbon fibers can include carbon microfibers and carbon nanofibers.

In accordance with another aspect, battery separators are provided. The battery separators can include polyvinyl alcohol having a plurality of hybrid carbon fibers embedded therein. The plurality of hybrid carbon fibers can include carbon microfibers and carbon nanofibers.

In accordance with another aspect, lithium ion batteries are provided. The lithium ion batteries can include a battery separator formed of polyvinyl alcohol having a plurality of hybrid carbon fibers embedded therein. The plurality of hybrid carbon fibers can include carbon microfibers and carbon nanofibers.

In accordance with another aspect, rechargeable batteries are provided. The rechargeable batteries can include at least one anode, at least one cathode and at least one battery separator formed of polyvinyl alcohol having a plurality of hybrid carbon fibers embedded therein. The rechargeable batteries can also include an electrolyte in ionic communication with the anode and the cathode through the battery separator.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof. While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Some embodiments are generally directed to a technique of forming polymeric nanocomposites. The present techniques provide polymeric nanocomposites that include hybrid carbon fibers formed in-situ and embedded within a polymer. The hybrid carbon fibers include a web of carbon microfibers and carbon nanofibers integrated with an insulating polymer. The polymeric nanocomposites disclosed herein have enhanced mechanical strength and electrochemical properties, are thermally stable, have high ionic conductivity and have substantially high wettability. Such nanocomposites may be used in battery separators for rechargeable batteries such as lithium-ion batteries. Moreover, such materials may also be used in other applications such as in fuel cells and purification systems.

Figure 1:
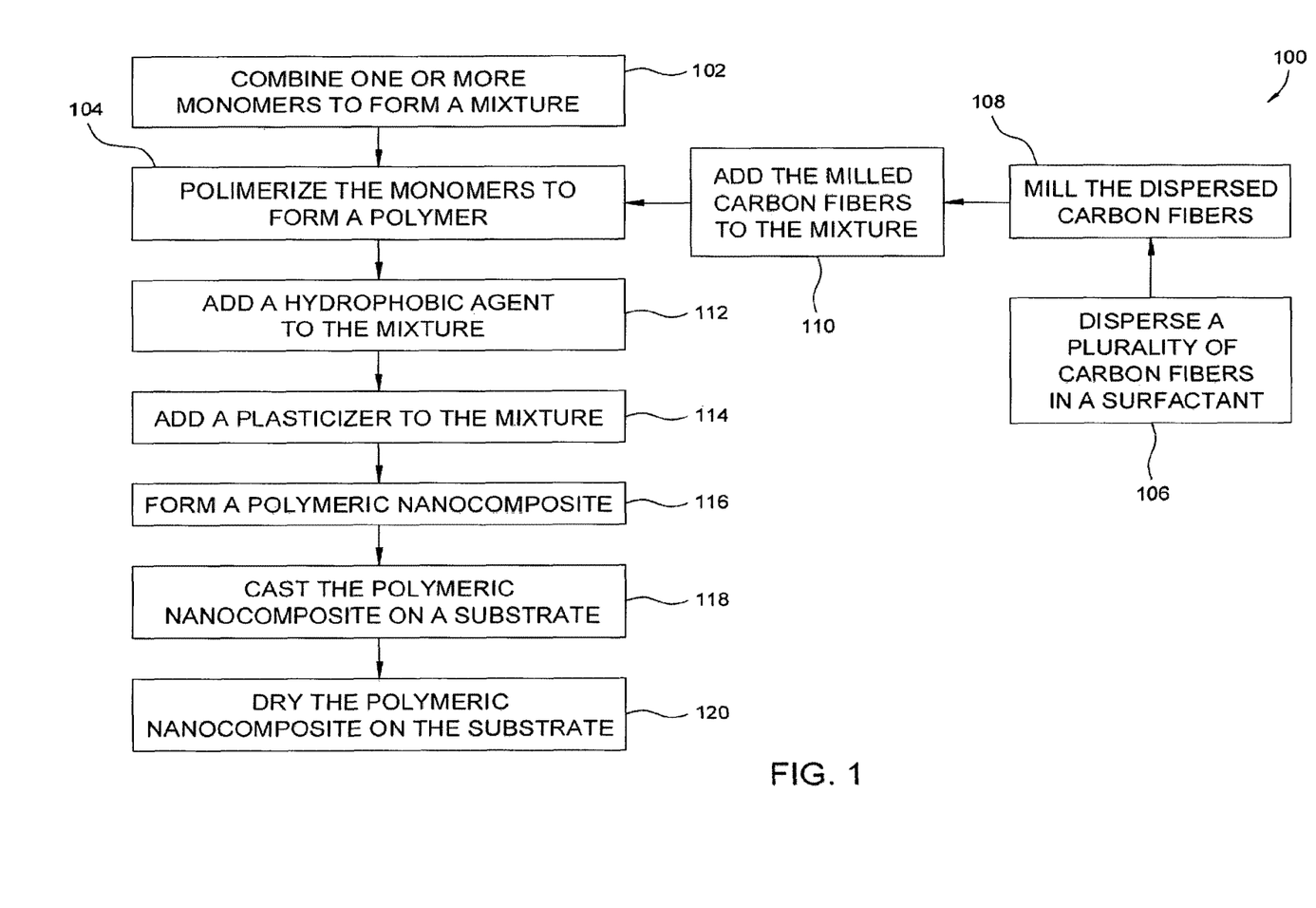
FIG. 1 is an example flow diagram of an embodiment of a method of forming a polymeric nanocomposite.

Referring now to FIG. 1, an example flow diagram 100 of an embodiment of a method of forming a polymeric nanocomposite is illustrated. At block 102, one or more monomers are combined to form a mixture. Moreover, the one or more monomers are polymerized to form a polymer (block 104). Examples of the polymer include, but are not limited to, polyvinyl alcohol (PVA), polypropylene (PP), polyethylene (PE), polyvinylidene fluoride (PVDF), or combinations thereof. In one example embodiment, polyvinyl acetate is esterified to form a PVA gel. In a specific embodiment, methanol, methyl acetate, and polyvinyl acetate are combined to form a homogenous solution. Moreover, sodium hydroxide is added to the homogenous solution to form the PVA gel.

At block 106, a plurality of carbon fibers are dispersed in a surfactant. The plurality of carbon fibers comprises carbon microfibers, carbon nanofibers, or combinations thereof. In one specific embodiment, the plurality of carbon fibers comprises, consist essentially of, or consists of carbon microfibers and carbon nanofibers. The plurality of carbon fibers may include any amounts of carbon microfibers and carbon nanofibers. In certain example embodiments, the carbon microfibers may be present in the plurality of carbon fibers in an amount of about 55% to about 65% by weight. Specific examples of the amount of carbon microfibers in the plurality of carbon fibers include about 55%, about 58%, about 60%, about 63%, about 65% by weight, and ranges between any two of these values (including endpoints). In certain example embodiments, the carbon nanofibers may be present in the plurality of carbon fibers in an amount of about 35% to about 45% by weight. Specific examples of the amount of carbon nanofibers in the plurality of carbon fibers include about 35%, about 38%, about 40%, about 43%, about 45% by weight, and ranges between any two of these values (including endpoints). The carbon microfibers may have an average diameter of about 2 micrometers (μm) to about 12 μm. Specific examples of average diameters include about 2 μm, about 4 μm, about 6 μm, about 8 μm, about 10 μm, about 12 μm, and ranges between any two of these values (including endpoints). Moreover, the carbon nanofibers may have an average diameter of about 40 nanometers (nm) to about 90 nm. Specific examples of average diameters include about 40 nm, about 50 nm, about 60 nm, about 70 nm, about 80 nm, about 90 nm, and ranges between any two of these values (including endpoints). Examples of the surfactant includes, but are not limited to, sodium dodecyl sulphate (SDS), tri-n-octylphosphine (TOPO), triton X-100, cetyltrimethylammonium bromide (CTAB), cetyl trimethylammonium chloride (CTAC), cetylpyridinium chloride (CPC), or combinations thereof.

At block 108, the dispersed carbon fibers are milled to form milled carbon fibers. In one example embodiment, the dispersed carbon fibers are ball milled. In general, the carbon fibers may be milled for any length of time such as about 15 minutes to about 2 hours. Specific examples of milling time include about 15 minutes, about 30 minutes, about 45 minutes, about 1 hour, about 75 minutes, about 90 minutes, about 105 minutes, about 2 hours and ranges between any two of these values (including endpoints). The milled carbon fibers have an average diameter of about 400 nm to about 650 nm. Specific examples of average diameters include about 400 nm, about 450 nm, about 500 nm, about 550 nm, about 600 nm, about 650 nm, and ranges between any two of these values (including endpoints). In one specific embodiment, the milled carbon fibers have an average diameter of about 500 nm. The milled carbon fibers are added to the mixture (block 110). In one example embodiment, the milled carbon fibers are added to the mixture concurrently with formation of the polymer. Alternately, the carbon fibers may be added to the mixture upon initiation of formation of the polymer.

At block 112, a hydrophobic agent is added to the mixture. The hydrophobic agent may include acrylonitrile, methyl acrylate, vinyl acetate, methylmethacrylate, or combinations thereof. In addition, at block 114, a plasticizer is added to the mixture to form the polymer nanocomposite (block 116). The plasticizer may include citrates, phthalates, lignosulphonates, or combinations thereof. Some examples of the plasticizer include polyethylene glycol, propylene glycol, triethyl citrate, diethyl phthalate, dibutyl phthalate, dibutyl sebacate, or combinations thereof.

The polymeric nanocomposite is subsequently casted on a substrate (block 118). In one example embodiment, the substrate includes a Teflon sheet. However, other suitable substrates may be used. At block 120, the casted polymeric nanocomposite is vacuum dried to form a nanocomposite film.

Figure 2:
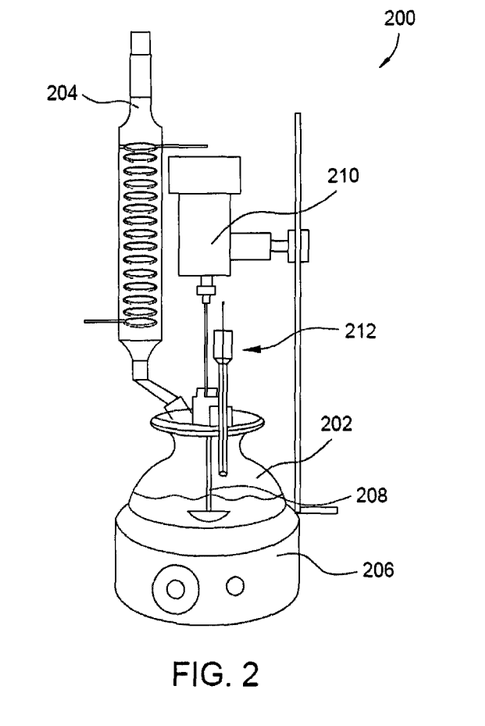
FIG. 2 is an example system for forming a polymeric nanocomposite.

FIG. 2 is an example system 200 for forming a polymeric nanocomposite. The system 200 includes a container 202 for forming the polymeric nanocomposite. The system 200 further includes a reflux condenser 204, a heating device 206 and a stirrer 208. In operation, one or more monomers are combined in a separate container (not shown). In one example embodiment, methanol, and polyvinyl acetate are combined to form a homogenous solution. The homogenous solution is then transferred to the container 202 and methanol and methyl acetate are added to the homogenous solution. The solution is mixed using the stirrer 208 at a suitable speed and sodium hydroxide solution is added to the homogenous solution to form the polymer. In general, the solution can be mixed by the stirrer 208 at high speeds such as about 100 rpm to about 175 rpm. In this exemplary configuration, a motor 210 is coupled to the stirrer 208 for rotating the stirrer 208 within the container 202.

The heating device 206 is configured to heat the container 202 to maintain suitable temperature of the solution within the container 202. In one embodiment, the container is heated to an elevated temperature, such as to a temperature of about 50° C. to about 90° C. while mixing the solution to form the polymer. In one specific embodiment, the temperature of the container is maintained at a temperature of about 60° C. The temperature of the solution within the container 202 is measured using a temperature sensing device such as a thermometer 212. Moreover, reflux condensing water in the reflux condenser 204 is used to maintain a desired level of the solution in the container 202.

In this embodiment, a plurality of carbon microfibers and carbon nanofibers dispersed in a surfactant are milled to form milled hybrid carbon fibers. The milled hybrid carbon fibers may be synthesized separately and are added to the solution prior to or concurrently with formation of the polymer. Examples of the surfactant includes, but are not limited to, sodium dodecyl sulphate (SDS), tri-n-octylphosphine (TOPO), triton X-100, cetyltrimethylammonium bromide (CTAB), cetyl trimethylammonium chloride (CTAC), cetylpyridinium chloride (CPC), or combinations thereof.

In one example embodiment, a composite material including carbon microfibers and carbon nanofibers is cut into small pieces and is dispersed in SDS-water solution. The solution containing the carbon microfibers and carbon nanofibers is transferred into a nano ball mill such as nano ball mill commercially available from Retsch, Germany and is milled to form the milled hybrid carbon fibers. In general, the solution can be milled for any length of time such as about 15 minutes to about 2 hours. The milled hybrid carbon fibers are then added to the polymer such as the PVA gel in the container 202. The container 202 having the polymer with the hybrid carbon fibers is maintained at an elevated temperature such as about 60° C. to about 80° C. to facilitate formation of the polymeric nanocomposite. Moreover, the speed of the stirrer 208 can be maintained at about 150 rpm to about 170 rpm.

A hydrophobic agent is then added to the polymer in the container 202 and the heating device 206 is turned off to bring the polymer to room temperature. Examples of the hydrophobic agent include, but are not limited to, acrylonitrile, methyl acrylate, vinyl acetate, methylmethacrylate, or combinations thereof. Subsequently, a plasticizer is added to the polymer and the hybrid carbon fibers to form the polymeric nanocomposite with the polymer having the hybrid carbon fibers embedded therein.

The plasticizer may include citrates, phthalates, lignosulphonates, or combinations thereof. Examples of the plasticizer include, but are not limited to, polyethylene glycol, propylene glycol, triethyl citrate, diethyl phthalate, dibutyl phthalate, dibutyl sebacate, or combinations thereof. Once the polymeric nanocomposite is formed, the rotation of the stirrer is stopped and the nanocomposite is casted on a substrate to form a nanocomposite film that can be used in a variety of applications such as for a battery separator or a purification device. The cast material may be vacuum dried at a suitable temperature such as about 50° C. to about 125° C. for any length of time such as about 6 hours to about 12 hours. Specific examples of time include about 6 hours, about 8 hours, about 10 hours, about 12 hours, and ranges between any two of these values (including endpoints).

EXAMPLES

The present invention will be described below in further detail with examples and comparative examples thereof, but it is noted that the present invention is by no means intended to be limited to these examples.

Example 1: Synthesis of a Polymeric Nanocomposite

A polymeric composite formed of PVA having carbon fibers embedded therein was formed using the example system of FIG. 2. Here, PVA gel was formed by esterification of polyvinyl acetate (PVAc). A mixture of about 62% (w/w) of PVAc and about 99% (w/w) methanol obtained from S.D. Fine-Chem. Ltd., India was first stirred in a container to prepare a homogeneous solution. Subsequently, about 40 g of the homogenous solution was transferred to the container 202. Here, the container 202 included a four-neck-round bottom glass assembly. The temperature of the container 202 was maintained at about 60° C. Moreover, about 25.5 ml methanol and about 22.5 ml methyl acetate were added to the solution in the container 202. The solution was mixed using the stirrer 208 at a speed of about 130 rpm until a transparent solution was obtained.

To this solution, about 5 ml methanolic sodium hydroxide (2.5% of sodium hydroxide (NaOH) dissolved in methanol) was added. After a time period of about 15 minutes, the PVA gel formation was observed. As the gel formation was initiated, ball-milled hybrid carbon fibers that were prepared separately were added to the solution.

The hybrid carbon fibers were formed using carbon microfibers and carbon nanofibers. Here, about 0.1 g of carbon microfibers and carbon nanofibers were randomly cut into small pieces having an average size of about 1 mm and were subsequently dispersed into about 20 ml of SDS and water (about 0.5% w/w) solution. The solution with the carbon fibers was transferred into a nano ball-mill from Retsch, Germany and was milled for about 2 hours at a speed of about 150 rpm using about 25 tungsten balls having a diameter of about 10 mm. This solution containing hybrid carbon fibers having an average diameter of about 500 nm was subsequently transferred to the solution described above.

After about 45 minutes of adding the ball milled hybrid carbon fibers to the solution, a black gel was formed. Subsequently, about 100 ml of Milli-Q water was added to the gel. Moreover, the temperature of the solution was maintained at about 80° C. and the speed of the stirrer 108 was increased to about 150 rpm. Further, in about 2 hours of time, a black solution was obtained. At this point, the temperature of the solution was decreased to about 60° C., while the speed of the stirrer 108 was maintained at about 150 rpm.

Furthermore, about 5 ml of methyl acrylate and 0.1 g of potassium persulfate obtained from Merck, Germany were added to the solution and after about 90 minutes, about 10 ml of acrylonitrile and about 0.1 g of potassium persulfate were also added to the solution. The solution was kept as is for a time period of about 6 hours and it was observed that the color of the solution changed from black to milky black. Then, the heating device 206 was switched off and after about 90 minutes, about 30 ml of PEG was added to the solution. It was observed that after a time period of about 3 hours, a black slurry-like material was formed. The stirrer 108 was then stopped and the slurry was removed and was cast on a Teflon sheet using a thin film applicator. Next, the cast material was vacuum dried for about 12 hours in an oven at a temperature of about 80° C. to form a polymeric nanocomposite film. The polymeric nanocomposite was used as a battery separator and was characterized as described below.

Example 2: Characterization of a Polymeric Nanocomposite

Figure 3:
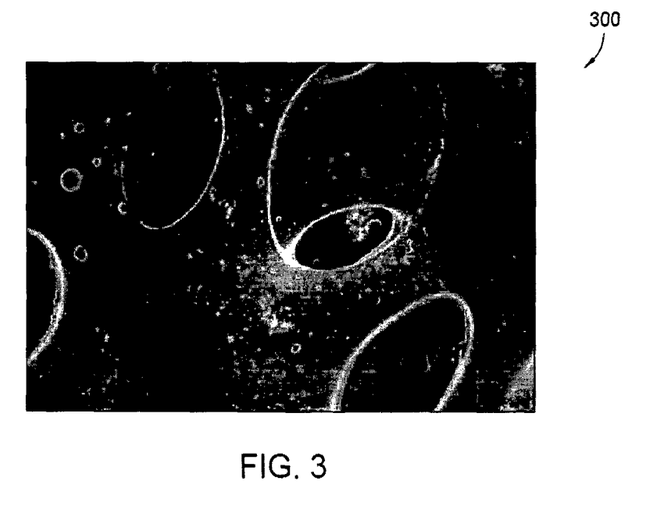
FIG. 3 is a scanning electron microscopy (SEM) image of a polymeric nanocomposite.
Figure 4:
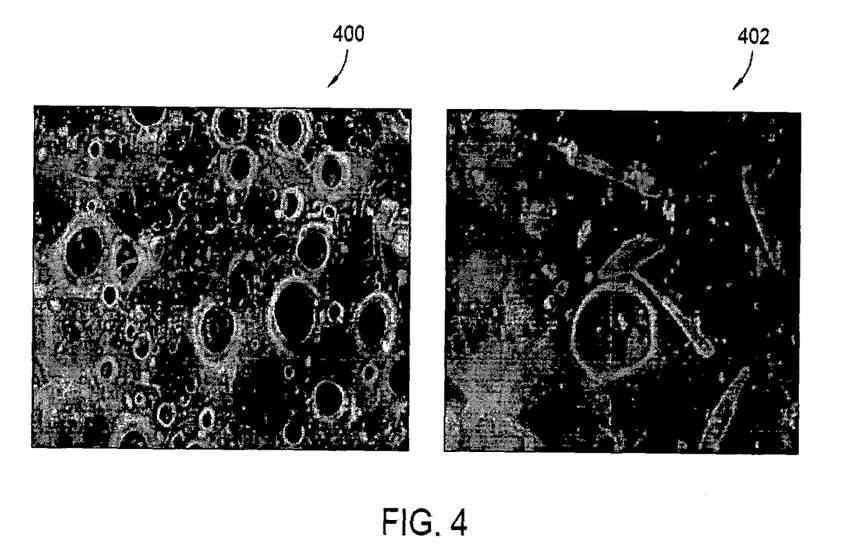
FIG. 4 illustrates low and high resolution SEM images of a polymeric nanocomposite with hybrid carbon fibers embedded within PVA.

FIG. 3 is a scanning electron microscopy (SEM) image 300 of the polymeric nanocomposite such as of Example 1. The surface morphology of the samples was studied using Supra 40 VP Field Emission scanning electron microscopy (SEM) procured from Zeiss, Germany. The images were captured with a VPSE detector at an accelerating voltage of about 20 kV and a filament current of about 2.37 A at a working distance of about 6 mm to about 7 mm. FIG. 4 illustrates low and high resolution SEM images 400 and 402 of a polymeric nanocomposite with hybrid carbon fibers embedded within PVA. Here, the hybrid carbon fibers included carbon microfibers and carbon nanofibers that were ball milled for about 15 minutes before adding the milled fibers to the PVA.

Figure 5:
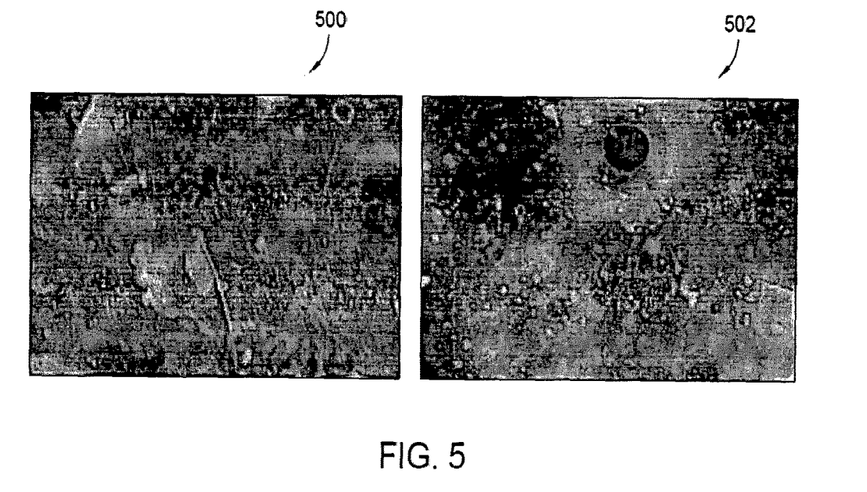
FIG. 5 illustrates low and high resolution SEM images of another polymeric nanocomposite with hybrid carbon fibers embedded within PVA.

FIG. 5 illustrates low and high resolution SEM images 500 and 502 of a polymeric nanocomposite with hybrid carbon fibers embedded within PVA. Here, the hybrid carbon fibers included carbon microfibers and carbon nanofibers that were ball milled for about 2 hours before adding the milled fibers to the PVA. As can be seen, the average diameter of the carbon fibers that were ball-milled for about 2 hours was about 100 nm that was substantially lesser than the average diameter of the carbon fibers (about 500 nm) that were ball-milled for about 15 minutes.

Figure 6:
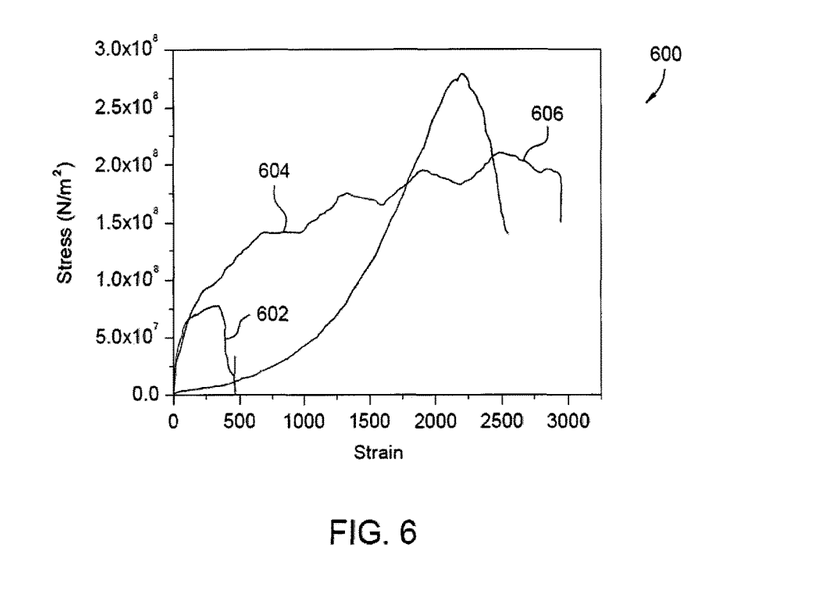
FIG. 6 illustrates example stress-strain profiles of PVA, hybrid carbon fibers and a polymeric nanocomposite.

FIG. 6 illustrates example stress-strain profiles 600 of PVA, hybrid carbon fibers and the polymeric nanocomposite of Example 1. A rectangular sample having length of about 50 mm, width of about 5 mm and a thickness of about 25 μm was subjected to the initial strain ramp of 0.5 per min and preload force of 0.001 N. The sample temperature was set to about 35° C. and an initial distance between holder grips was set to be about 20 mm. Here, the tensile strength was measured by a tensile machine (UTM-Zwick/roell-Z010, Germany).

The stress-strain profiles for the PVA, hybrid carbon fibers and the polymeric nanocomposite are represented by reference numerals 602, 604 and 606 respectively. As can be seen from the profile 602, the yield tensile strength of PVA was measured to be about 789 kg-f-cm$^{-2}$. Moreover, as can be seen from profile 604, the yield tensile strength of the hybrid carbon fibers including carbon microfibers and carbon nanofibers was measured to be about 2830 kg-f-cm$^{-2}$). Here, as can be seen from the profile 606, the tensile strength of the polymeric nanocomposite with the hybrid carbon fibers was measured to be about 2146 kg-f-cm$^{-2}$ that was substantially higher than that of the PVA.

It should also be noted that the tensile strength of the polymeric nanocomposite was substantially higher than the tensile strength of commercial Li-ion battery separators such as Celgard-2325 having a tensile strength of about 1900 kg-f-cm$^{-2}$, Celgard-2340 having a tensile strength of about 2100 kg-f-cm$^{-2}$, Tonen-1 having a tensile strength of about 1500 kg-f-cm$^{-2}$, a PVdF-based material having a tensile strength of about 271 kg-f-cm$^{-2}$ and a composite cellulosic separator material having a tensile strength of about 53-850 kg-f-cm$^{-2}$.

Figure 7:
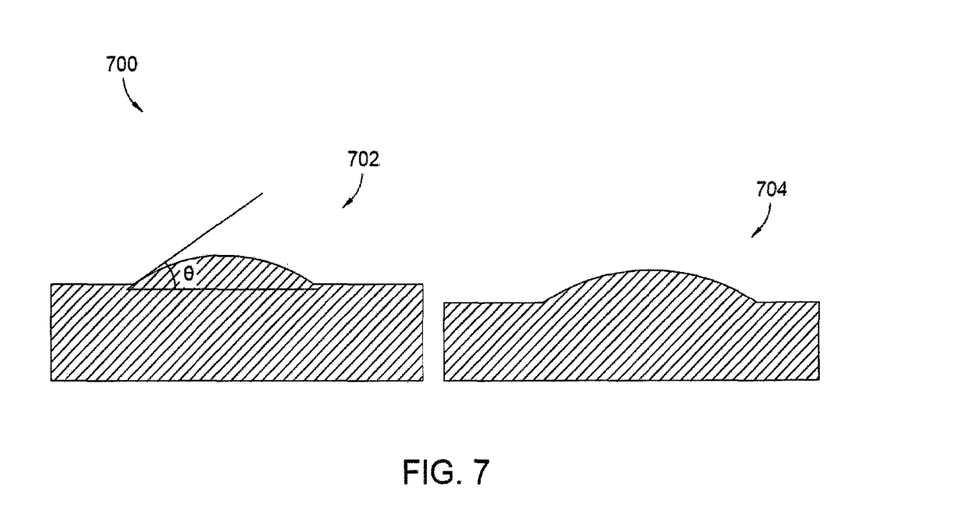
FIG. 7 shows example images of contact angles for PVA and a polymeric nanocomposite used as battery separators.

FIG. 7 shows example images 700 of contact angles for PVA and a polymeric nanocomposite used as battery separators. The images for the PVA and the polymeric nanocomposite with hybrid carbon nanofibers embedded within PVA are represented by reference numerals 702 and 704 respectively. Here, a drop of electrolyte was deposited on the surface of the material, and the contact angle was immediately measured and recorded. The images 702 and 704 were obtained using a contact angle goniometer, Rame-hart-200, Germany. As obtained from the image 702, the contact angle for the PVA was measured at about 33.3° C. Moreover, the contact angle for the formed polymeric nanocomposite significantly decreased to about 21.1° indicating significant increase in the wettability of the surface with the electrolyte. Here, the hybrid carbon fibers embedded in the PVA were observed to be substantially wet with the electrolyte.

Figure 8:
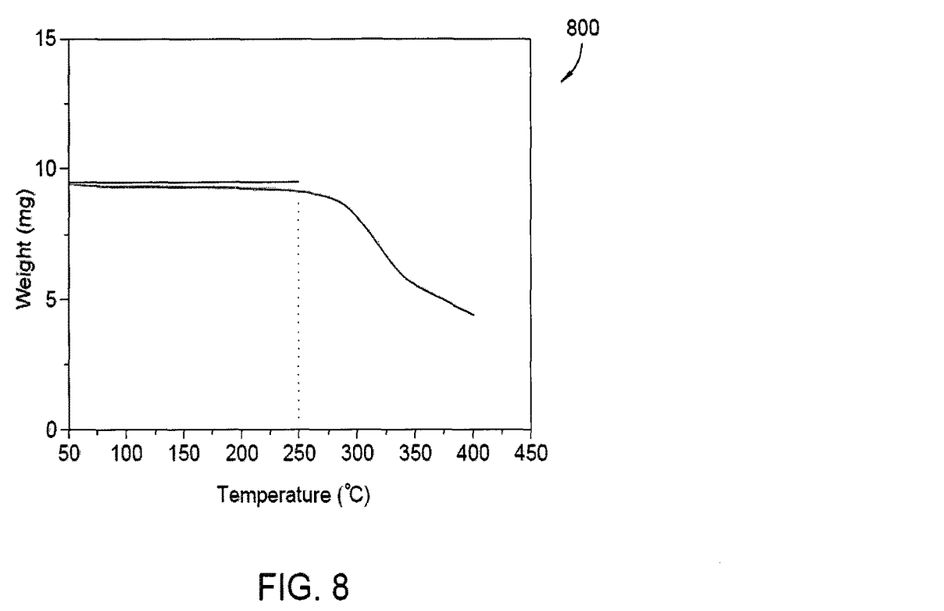
FIG. 8 shows an example thermo gravimetric analysis (TGA) curve obtained for the polymeric nanocomposite with hybrid carbon nanofibers embedded within PVA.

FIG. 8 shows an example thermo gravimetric analysis (TGA) curve 800 obtained for the polymeric nanocomposite with hybrid carbon nanofibers embedded within PVA. The analysis was carried out for a temperature range of about 50° C. to about 350° C. As can be seen from the curve 800, the measured weight loss is less than about 5% over the temperature range of about 50° C. to about 250° C. owing to outgassing of moisture or volatile species from the polymeric nanocomposite. Moreover, substantial weight loss was observed at temperatures higher than about 250° C.

Figure 9:
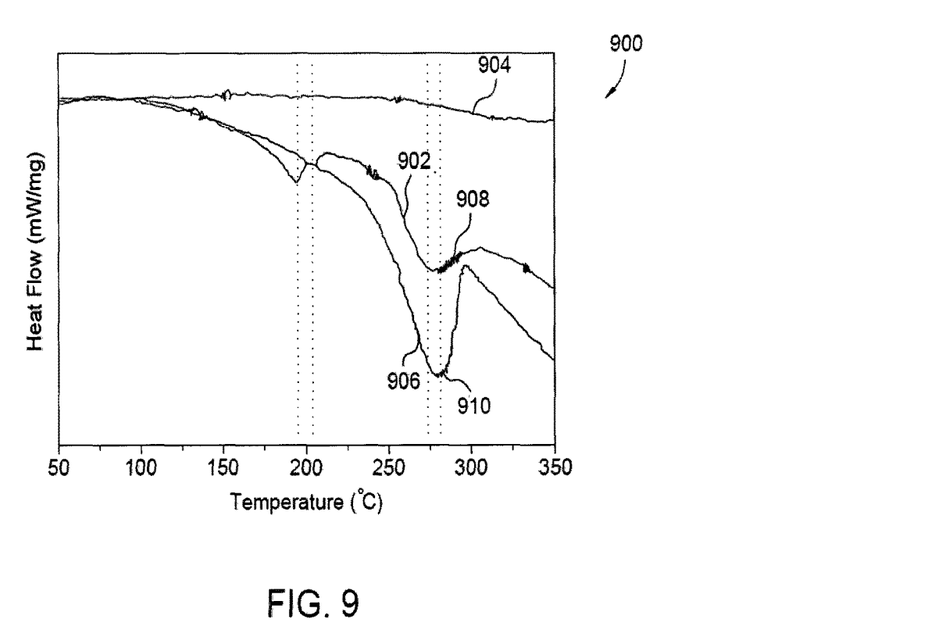
FIG. 9 shows example differential scanning calorimeter (DSC) curves obtained for PVA, hybrid carbon fibers and a polymeric nanocomposite.

FIG. 9 shows example differential scanning calorimeter (DSC) curves 900 obtained for PVA, hybrid carbon fibers and the polymeric nanocomposite such as of Example 1. The DSC curves were obtained for a temperature range of about 50° C. to about 350° C. The DSC curves for the PVA, hybrid carbon fibers and the polymeric nanocomposite are represented by reference numerals 902, 904 and 906 respectively. As can be seen from curve 904, no thermal peak was observed for the incorporated hybrid carbon fibers over the entire temperature range.

Moreover, as seen from curves 902 and 906, a decrease in the heat flow was observed for PVA and the polymeric nanocomposite at a temperature of about 130° C. Such decrease in the heat flow is a characteristic of PVA. Moreover, peaks 908 and 910 observed for PVA and the polymeric nanocomposite respectively at a temperature of about 275° C. indicated meltdown of the polymeric crystalline phase over the temperature range. These results indicated a potentially high melt integrity and thermal stability of the polymeric nanocomposite against a catastrophic thermal runway condition during a battery operation.

Figure 10:
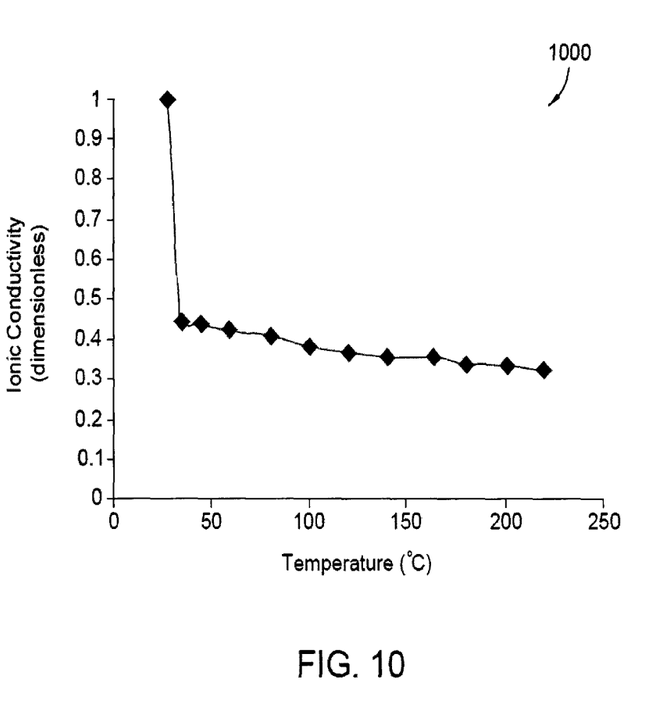
FIG. 10 shows example profile of change in ionic conductivity of the polymeric nanocomposite used as a battery separator.

FIG. 10 shows example profile 1000 of a change in ionic conductivity of the polymeric nanocomposite used as a battery separator. The ionic conductivity measurements were performed on the prepared materials after saturating them with LiPF$_6$ liquid electrolyte. The liquid electrolyte was prepared by mixing equal volume (5 cc) of ethylene carbonate (EC) and dimethyl carbonate (DMC). The resistivity or ionic conductivity was measured by an I-V source meter, Keithley 6221 from USA. Here the change in the ionic conductivity is shown relative to an operating temperature. The ionic conductivity of the polymeric nanocomposite was plotted relative to the original conductivity of the material at a room temperature of about 30° C. As can be seen from the profile 1000, the conductivity was observed to be substantially constant over a temperature range of about 35° C. to about 220° C. after initial decrease in the conductivity of the material over a temperature range of 30° C. to about 35° C. These results were indicative of chemical stability of the material over a broad temperature range.

Shrinkage tests were carried out to ascertain an extent of shrinkage in the polymeric nanocomposite used as a battery separator material when immersed in an electrolyte. Here, two rectangular films were immersed in the electrolytic solution for about 120 hours. The length, width and thickness of the first rectangular film were about 30 mm, about 30 mm and about 25 µm respectively. Moreover, the length, width and thickness of the second rectangular film were about 30 mm, about 15 mm and about 25 µm respectively. The dimensions of the wet samples were measured over a time period of about 12 hours, 24 hours, 72 hours and 120 hours. The maximum percentage changes in the film dimensions were measured to be about 1% to about 2% after a time period of about 24 hours following which the dimensions remained substantially constant. These results demonstrated the resistance of the prepared nanocomposite materials to shrinkage on wetting with electrolytic fluids.

Example 3: Comparative Results for Electrochemical and Mechanical Properties for PVA, Hybrid Carbon Fibers and the Polymeric Nanocomposite Used as a Battery Separator Material Table 1 shows the results for specific resistance, ionic conductivity, tensile strength and contact angle for the PVA, hybrid carbon fibers and the polymeric nanocomposite respectively.

TABLE 1

| Sample | Without Electrolyte | | With Electrolyte | | | |
|---|---|---|---|---|---|---|
| | Specific Resistance (ohm-cm) | Ionic Conductivity (S-cm$^{-1}$) | Specific Resistance (ohm-cm) | Ionic Conductivity (S-cm$^{-1}$) | Tensile Strength (kgf cm$^{-2}$) | Contact Angle (degrees) |
| Hybrid Carbon Fibers | 1.06 | $9.4 \times 10^{-1}$ | $6.38 \times 10^{-1}$ | 1.57 | 2830 | 0 |
| PVA | $1.51 \times 10^{3}$ | $6.61 \times 10^{-4}$ | $8.56 \times 10^{2}$ | $1.17 \times 10^{-3}$ | 789 | 33.3 |
| Polymeric Nanocomposite | $3.16 \times 10^{1}$ | $3.16 \times 10^{-2}$ | 8.40 | $1.19 \times 10^{-1}$ | 2146 | 21.1 |

As can be seen, the polymeric nanocomposite has enhanced ionic conductivity (i.e., reduced specific resistance) and mechanical strength relative to that of the PVA and hybrid carbon fibers. The specific resistance of the prepared polymeric nanocomposite decreased by about two orders of magnitude relative to the specific resistance of PVA. Moreover, the tensile strength of the polymeric nanocomposite increased by about three orders of magnitude relative to the tensile strength of PVA.

Further, as can be seen, the contact angle for the hybrid carbon fibers was measured to be about 0 degrees in the table. The contact angle obtained for the polymeric nanocomposite was about 21.1° and was comparable to or relatively lower than contact angles for commercial battery separators such as ionic liquid modified separator having a contact angle of about 15.8°, plain separator having a contact angle of about 21.6°, Celgard-2320 having a contact angle of about 60.9°, and Celgard-2730 having a contact angle of about 53.1°.

Example 4: A Rechargeable Battery

A lithium ion battery was assembled using the polymeric nanocomposite as a battery separator material. The rechargeable battery included at least one anode and at least one cathode. The rechargeable battery also included at least one battery separator formed of polyvinyl alcohol having a plurality of hybrid carbon fibers embedded therein and an electrolyte in ionic communication with the anode and the cathode through the battery separator. The hybrid carbon fibers included carbon microfibers and carbon nanofibers.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of forming a polymeric nanocomposite, the method comprising:
    milling a plurality of carbon microfibers and carbon nanofibers dispersed in a surfactant to form a plurality of milled hybrid carbon fibers, wherein the plurality of carbon microfibers and carbon nanofibers have an average size of 1 mm, and wherein the plurality of carbon microfibers are present in an amount of 55% to 65% by weight in the plurality of carbon microfibers and carbon nanofibers;
    esterifying polyvinyl acetate to form polyvinyl alcohol (PVA) gel;
    adding the plurality of milled hybrid carbon fibers to the polyvinyl acetate prior to or concurrently with formation of the PVA gel, wherein each hybrid carbon fiber of the plurality of milled hybrid carbon fibers has an average diameter of 400 nanometers (nm) to 650 nm;
    adding a hydrophobic agent and a plasticizer to the PVA gel and the plurality of milled hybrid carbon fibers to form the polymeric nanocomposite; and
    maintaining a mixture of the PVA gel and the plurality of the milled hybrid carbon fibers at an elevated temperature of 60° C. to 80° C.

2. The method of claim 1, wherein the plurality of milled hybrid carbon fibers is added to the polyvinyl acetate concurrently with formation of the PVA gel.

3. The method of claim 1, wherein the plurality of milled hybrid carbon fibers is added to the polyvinyl acetate upon initiation of formation of the PVA gel.

4. The method of claim 1, wherein esterifying the polyvinyl acetate comprises:
    combining methanol, methyl acetate, and the polyvinyl acetate to form a homogenous solution; and
    adding sodium hydroxide to the homogenous solution.

5. The method of claim 1, wherein the surfactant comprises sodium dodecyl sulphate (SDS), tri-n-octylphosphine (TOPO), triton X-100, cetyltrimethylammonium bromide (CTAB), cetyl trimethylammonium chloride (CTAC), cetylpyridinium chloride (CPC), or combinations thereof.

6. The method of claim 1, wherein milling the plurality of carbon microfibers and carbon nanofibers comprises ball milling.

7. The method of claim 1, wherein each carbon microfiber of the plurality of carbon microfibers has an average diameter of 2 μm to 12 μm.

8. The method of claim 1, wherein each carbon nanofiber of the plurality of carbon nanofibers has an average diameter of 40 nm to 90 nm.

9. The method of claim 1, wherein the hydrophobic agent comprises acrylonitrile, methyl acrylate, vinyl acetate, methylmethacrylate, or combinations thereof.

10. The method of claim 1, wherein the plasticizer comprises citrates, phthalates, lignosulphonates, or combinations thereof.

11. The method of claim 1, wherein the plasticizer comprises polyethylene glycol, propylene glycol, triethyl citrate, diethyl phthalate, dibutyl phthalate, dibutyl sebacate, or combinations thereof.

12. The method of claim 1, wherein milling the plurality of carbon microfibers and carbon nanofibers comprises milling the plurality of carbon microfibers and carbon nanofibers for a time period of about 15 minutes to about 2 hours.

13. A method of forming a polymeric nanocomposite, the method comprising:
    combining one or more monomers to form a mixture;
    polymerizing the mixture comprising one or more monomers to form a polymer;
    adding a plurality of milled hybrid carbon fibers prior to or concurrently with the polymerizing the mixture comprising one or more monomers, wherein the plurality of milled hybrid carbon fibers comprises carbon microfibers and carbon nanofibers (CNFs) having an average size of 1 mm, wherein each hybrid carbon fiber of the plurality of milled hybrid carbon fibers has an average diameter of 400 nanometers (nm) to 650 nm, and wherein the plurality of milled hybrid carbon fibers comprises carbon microfibers in an amount of 55% to 65% by weight;

adding a hydrophobic agent and a plasticizer to the mixture to form the polymeric nanocomposite; and maintaining the mixture to form the polymeric nanocomposite at an elevated temperature of 60° C. to 80° C.

14. The method of claim 13, wherein the hydrophobic agent comprises acrylonitrile, methyl acrylate, vinyl acetate, methylmethacrylate, or combinations thereof.

15. The method of claim 13, wherein the plasticizer comprises citrates, phthalates, lignosulphonates, or combinations thereof.

16. The method of claim 13, wherein the plasticizer comprises polyethylene glycol, propylene glycol, triethyl citrate, diethyl phthalate, dibutyl phthalate, dibutyl sebacate, or combinations thereof.

17. The method of claim 13, further comprising:

casting the polymeric nanocomposite on a substrate; and drying the polymeric nanocomposite to form a polymeric nanocomposite film.

* * * * *